June 9, 1942.  T. A. McCOY  2,285,527
LIQUID METERING DEVICE
Filed Aug. 29, 1939  2 Sheets-Sheet 1
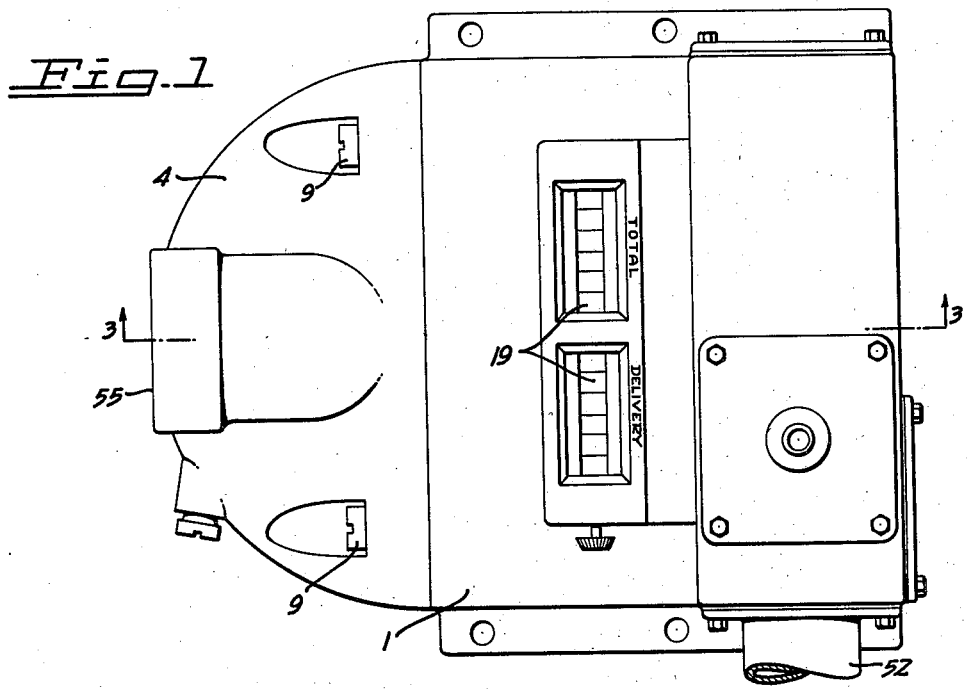
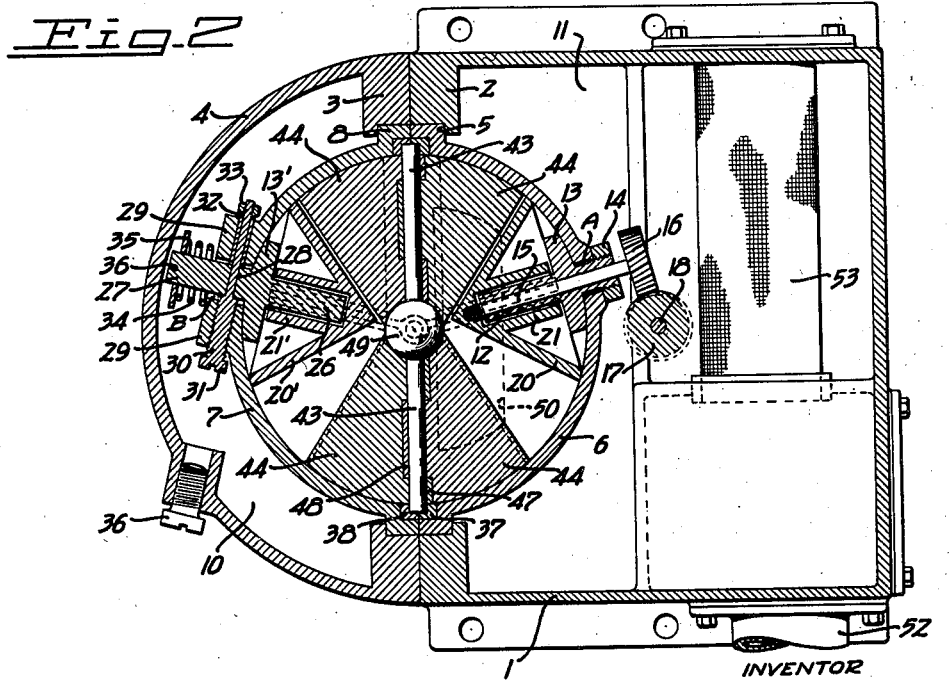
INVENTOR
THOMAS A. McCOY
BY Boyken & Mohler
ATTORNEYS June 9, 1942.  T. A. McCOY  2,285,527
LIQUID METERING DEVICE
Filed Aug. 29, 1939   2 Sheets-Sheet 2
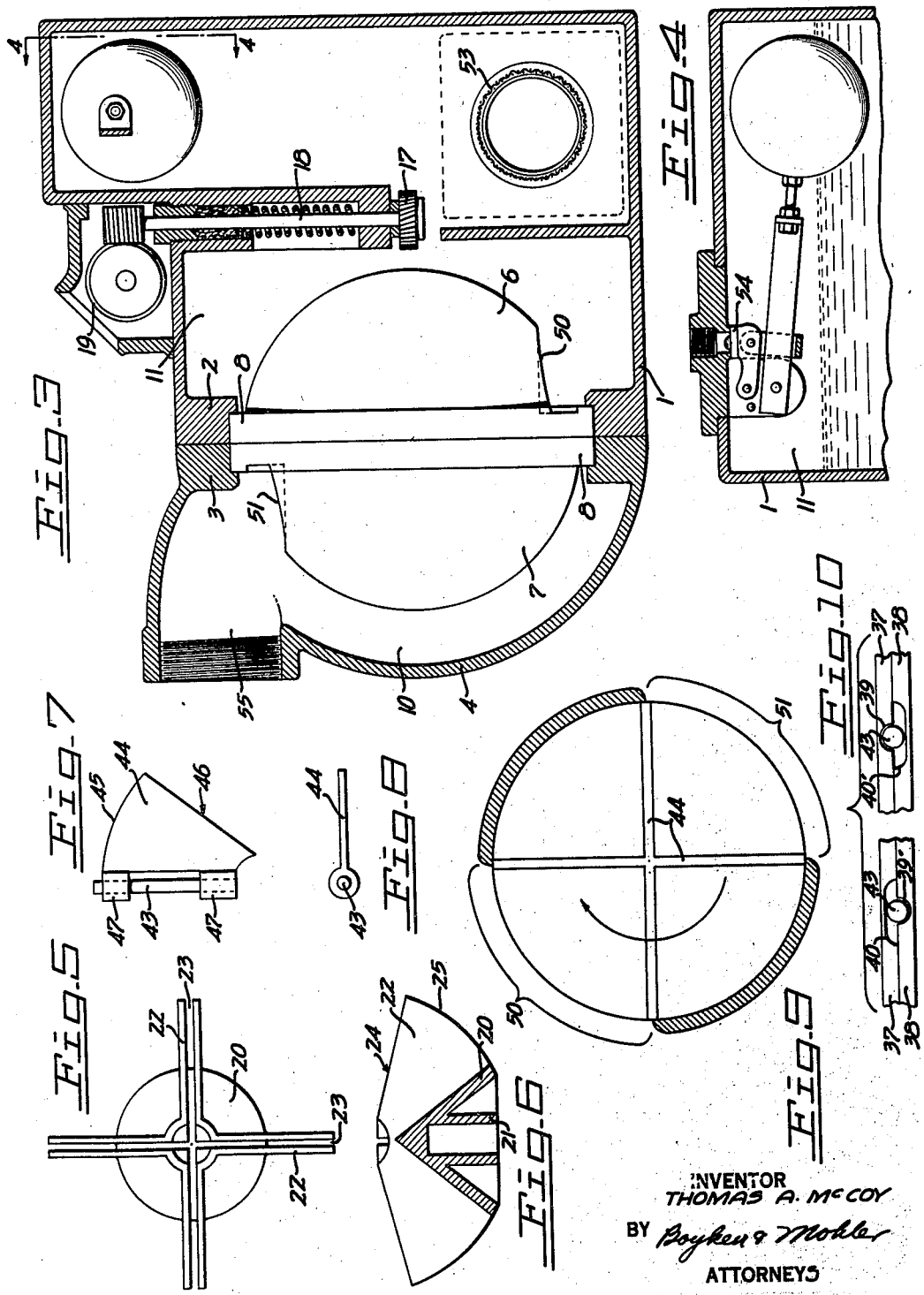
INVENTOR
THOMAS A. McCOY
BY Boyken & Mohler
ATTORNEYS Patented June 9, 1942

2,285,527

UNITED STATES PATENT OFFICE 2,285,527

LIQUID METERING DEVICE

Thomas A. McCoy, Emeryville, Calif., assignor to Granberg Equipment Inc., Oakland, Calif., a corporation of California Application August 29, 1939, Serial No. 292,427

7 Claims. (Cl. 73—253)

This invention relates to a meter for liquids, and has for one of its objects, a novel, simple, compact and reliable metering device adapted to be actuated by a flowing liquid and to measure such liquid as it flows through said device. Other objects will appear in the specification and drawings annexed hereto.

In the drawings,

Fig. 1 is a plan view of the device.

Fig. 2 is a sectional view of the device of Fig. 1.

Fig. 3 is a view partly in section and partly in elevation, taken along line 3—3 of Fig. 1.

Fig. 4 is a fragmentary sectional view taken along line 4—4 of Fig. 3.

Fig. 5 is an elevational view of one of the elements in my device.

Fig. 6 is a sectional view of one of the elements of my device.

Fig. 7 is an elevational view of another of the elements of my device.

Fig. 8 is a view of the device of Fig. 7 as seen from one edge thereof.

Fig. 9 is a diagrammatic view showing the relative position of the movable blades in my device relative to the liquid inlet and outlet in the chamber enclosing said blades.

Fig. 10 is a fragmentary view showing in elevation portions of two ring-like mountings in said device at points spaced 90° apart on the sides of the rings.

In detail, the metering device disclosed in the drawings comprises an outer casing consisting of a main body 1 having lateral sides and closed at one end with the opposite end open and the lateral walls at their edges adjacent the open end are formed to provide a continuous, inwardly projecting, relatively thick flange 2 in which the inner, free edge of said flange is circular. A corresponding, similarly shaped flange 3 of similar thickness to flange 2, projects inwardly from the free edges of a hemispherical wall 4 that is adapted to cover the open side of the body 1, with the convex side of said wall 4 facing outwardly, when the sides of said flanges are together.

The radially inwardly facing sides of flanges 2, 3, are recessed, circumferentially thereof, a distance from their adjacent sides so that the pair of flanges, when together, provide a central channel 5, one of the sides of which channel is formed on each flange, the bottom of the channel extending flat across the line of division between the flanges.

Fitted within the annular opening formed by the inner edges of flanges 3, 2, is a hollow, spherical housing formed in halves 6, 7. The halves 6, 7 are divided in the same plane as the line of division between flanges 2, 3, and each of the halves is formed with an outwardly projecting annular flange 8 around the edges thereof at the line of division between said halves, which flanges 8 are sealed against each other on their adjacent sides. These flanges 8 also fit in the channel 5 formed by the recesses in the inwardly facing edges of flanges 2, 3.

The cover wall 4 and body 1 are securely bolted together by stud bolts 9 (Fig. 1) that pass through flange 3 and threadedly engage threaded openings in flange 2. Thus when said bolts are tightened, the flanges 8 are likewise tightly drawn together and the housing, comprising halves 6, 7 form a partition between space 10 and the area within the body 1, thus providing a chamber 10 at the side of said housing adjacent the wall 4, and a chamber 11 at the opposite side of the housing in body 1.

The halves 6, 7, of the spherical housing are respectively formed with circular openings A, B therethrough disposed in a plane perpendicular to the plane of the line of division between said halves, the central axes of said openings, respectively, being coaxial with radii extending from the center of the housing. A tubular bearing 12 extends through the said opening in half 6, which bearing is formed at a point therearound adjacent the inner side of half 6 with a circular, outwardly projecting flange 13. The side of said flange overlying the inwardly facing margin of half 6 around the opening therewith, being curved to correspond to the curvature of the inner side of said half. The end of said bearing that projects outwardly of the half 6 is threaded for a nut 14 adapted to draw the flange 13 tight against the said margin when the nut is tightened. Thus, when nut 14 is tightened, a bearing is rigid with the half 6. The bearing 12 continues inwardly into the spherical housing a substantial distance, but terminates short of the center of said housing.

Rotatably extending through the bore of the bearing 12, and projecting at its opposite ends outwardly of the ends of said bore, is a shaft 15. The outer end of said shaft outwardly of the housing carries a spiral gear 16 in mesh with a spiral gear 17 on shaft 18 that is the drive shaft for a conventional counter or tabulating mechanism adapted to actuate the usual counter wheels 19, indicated in Fig. 1. There is nothing novel in this counter mechanism, in itself, since the same is old in the art, hence the details thereof are not shown.

The inner end of shaft 15 that is inside the housing, is threadedly secured to the inner side of a hollow cone 20 at a point adjacent the apex of the latter, the shaft 15 being coaxial with the central axis of the cone. A hub 21, also coaxial with said axis, extends inwardly inside the cone from adjacent the apex thereof, which hub rotatably extends over bearing 12 and terminates at its end remote from said apex adjacent flange 13.

The outer sides of said cone 20 carry four outwardly extending wings 22 which are formed integrally with the cone, said wings being planar sided and disposed in planes intersecting at the apex of the cone at right angles. Each of said wings is centrally slotted at 23 in the plane thereof midway between its outer sides, thus virtually dividing each wing into a pair of similar, parallel, planar sided wings, the slot 23 forming a space therebetween. Said wings 22 extend along their edge adjacent the cone from a point outwardly of the apex thereof to the base of the cone, and connect with each other outwardly of said apex, and the slots 23 communicate with each other outwardly of said apex, to form a cross, as best seen in Fig. 5.

From their connecting ends outwardly of the apex of said cone, the outer free edges 24 of the wings extend straight to the inner sides of the spherical housing along lines obtusely intersecting at the point centrally within the housing, and the edges 25 of the wings extending from the base of the cone to the ends of edges 24 at said inner sides of the housing, are arcuately shaped to correspond to the curvature of the inner sides of the housing, and to slidably engage said inner sides.

Extending loosely through the opening B in half 7 is shaft 26, which shaft is formed with an outwardly projecting flange 13' similar to flange 13 on bearing 12. The shaft 26 continues inwardly into the housing to a point therein adjacent the apex of a cone 20' that is the same as cone 20, and the hub 21' extending from the inner side of said cone at the apex end rotatably mounts said cone on shaft 26 coaxially with the axis of said shaft. The cone 20' carries slotted wings identical with those on cone 20, and parts similar to those already described with reference to cone 20 bear the same numbers, but are primed in Fig. 2.

The portion 27 of shaft 26 that projects outwardly of the half 7 is formed with an opening 28 extending transversely therethrough and spaced from opposite sides of the end 27, the wall of half 7 has ears 29, which ears are formed with openings in axial alignment with opening 28. A bolt extends through said openings in ears 29 and opening 28, which bolt is threaded adjacent the head 31 to threadedly engage in one of the ears 29, with the portion thereof extending through opening 28, being of reduced diameter and smooth, and loosely passing through said opening, and which portion continues into a sleeve 32 that is slidably fitted in the opening in the other ear 29. Sleeve 32 engages one side of shaft 26 at one of its ends and projects outwardly of the ear 29 through which it extends, at its opposite end, and the smooth, or unthreaded, reduced diameter portion of bolt 30 extends at its outer end beyond said opposite end of sleeve 32. Said outer end of bolt 31 is threaded for lock nuts 33 that secure the sleeve tight between such nuts and shaft 26. A shoulder at the junction of the threads engaging in one of the ears 29, and the unthreaded portion of said bolt, engages the side of shaft 26 opposite the sleeve 32, thus the shaft 26 is held between said shoulder and sleeve, but upon turning the head 31 of the said bolt, the shaft 26 will be moved slightly in one direction or the other circumferentially of the housing.

In order to insure flange 13' being held tightly against the inner side of the half 7 of the spherical housing, I provide a flat coil spring 34 around the end 27 of shaft 26, of which spring reacts between the outer ends of ears 29 and a washer 35 secured on the outer end of end 27 by a cotter pin 36 or the like, as indicated in Fig. 2.

An opening in the wall 4 in axial alignment with the bolt 30 is to enable adjusting the bolt 30 from outside the housing, which opening is normally closed by a screw plug 36.

The central axes of cones 20, 20' extend through a point centrally within the spherical housing, which axes are in the same plane, but are spaced about 75 degrees from the line of division between the halves, this spacing being determined for each axis, from the same point along said line of division. Thus the axes meet at the center of the spherical housing at an angle of about 150 degrees, as seen in Fig. 2. The plane in which said axes are disposed is the central plane bisecting the spherical housing perpendicularly to the plane of the line of division between said halves.

The inner edges of the halves 6, 7 along the line of division between said halves, are cut away to form the sides and bottom of a channel similar to the channel formed in the flanges 2, 3 but smaller. In the cut away edge of half 6 is a ring 37 and in the cut away edge of half 7 is a ring 38, which rings slidably engage each other on their adjacent sides and are circumferentially rotatable in the channel formed by the cut away edges. At four equally spaced points around the side of ring 37 that is adjacent the ring 38, said ring 37 is formed with recesses extending transversely thereacross in direction radially of the central axis of the ring opening, the recesses at two opposite sides of the ring, indicated at 39 in Fig. 10, in direction circumferentially thereof, being half round, or semi-cylindrical in shape, and the other two recesses 40, at the other two opposite sides being elongated circumferentially of the ring. In ring 38 on the side adjacent ring 37, are also four equally spaced recesses complementarily disposed relative to the recesses in ring 37, but the two semicylindrical sided recesses 39 in ring 37 are opposite the elongated recesses 40' in ring 38, and the half rounded recesses 39' in ring 38 are opposite the recesses 40 in ring 37.

Fitted at their ends in the opposed pairs of recesses in the rings 37, 38 are four cylindrical shafts 43 that extend radially outwardly of the central point in the spherical housing.

Pivotally supported on each of these shafts 43 are vanes 44, best indicated in Fig. 7. These vanes are flat plates substantially conforming in outline to that of sectors of a circle with converging edges and arcuate outer edges 45, in the direction of greatest width, conforming to the curvature of the inner sides of the spherical housing. One of the straight, diverging edges 46 of each of the vanes 44 is disposed within one of the slots 23 of the wings 22 in which position the curved outer edge 45 extends in continuation of the curvature of the curved edges 25 of the wings.

The edges of the vanes opposite the edges 46 are formed with lugs apertured for slidably receiving the shafts 43 therethrough, with two vanes at opposite sides of each shaft. One of the vanes at one side of each shaft carries a pair of spaced lugs 47 while the vane extending from the opposite side of the shaft carries a lug 48 fitted between the lugs 47, the openings through said lugs 47, 48 of each pair of vanes being in alignment for passing shaft 43.

At the inner ends of the wings 22, vanes 44 and shafts 43, or at their inner ends centrally within the spherical housing, the said wings, vanes and shafts are curved to seat against a spherical ball 49.

From the foregoing description of the various elements within the spherical housing, it will be seen that the area within said housing is divided by the wings and vanes into four chambers each of which is of appreciably greater area at one side of a plane bisecting the housing perpendicularly to the plane of the line of division between halves 6, 7 than at the other side of the bisecting plane.

It is also manifest that upon revolving of the wings and vanes about the axes of the shafts 15, 26, the cubic area within each of the four chambers, will, during each revolution, increase and decrease. This action is utilized in causing revolution of the vanes and wings for metering the liquid, as follows.

In one side of the half 6 I provide an opening 50, which opening is elongated in direction parallel with the line of division between the halves, and adjacent the flange 8 of said half 6, the length of said opening being only a very small distance less than the distance between the portions of the outer edges of adjacent vanes that are adapted to sweep across said opening. The said opening is also positioned to be bisected by a plane perpendicular to the plane of the line of division between halves 6, 7.

The half 7 is formed with a similar opening 51, which opening is positioned exactly on the opposite side of the spherical housing from opening 50, hence the same relation exists between the length of opening 51 and the distance between the outer edges of the adjacent vanes that are adapted to move across said opening 51.

In Fig. 9 the relation between the vanes and openings 50, 51 is diagrammatically illustrated.

Liquid, such as petroleum products, or other flowable liquid, enters the casing 1 through an inlet 52 and then passes through a screen 53 into chamber 11. A float controlled valve 54 in the upper end of casing 1 functions to release air in the casing to permit the filling of chamber 11 with the liquid, and when substantially so filled the valve 54 automatically closes by the rise in the liquid level.

The chamber 10 at the side of the spherical housing opposite chamber 11, is provided with a liquid outlet opening 55 connected with a pipe, hose, or the like, for conducting the liquid to a point for discharge. Thus it will be seen that the high pressure side of the spherical housing is in chamber 11, while the low pressure side, when liquid is being dispensed, is in chamber 10.

In operation the liquid in chamber 11, under pressure, passes through opening 50 and into the spherical housing. Since the progressively expanding area of the compartments between adjacent pairs of the vanes at each of the sides of rings 37, 38, is in the side of the housing opposite that in which both cones are disposed, the vanes and wings will be caused to rotate in the direction of such progressive expansion of said chambers. The minimum area of such chambers, is substantially reached, when the vanes 44 have been caused to move inwardly into said slots 23 to the point where the free straight edges of the vanes are substantially at the bottoms of slots 23. The maximum area between adjacent pairs of vanes at each side of rings 37, 38, is reached, when the edges 46 of the vanes are adjacent the outer, free edges 24 of the wings 20, although the vanes are never withdrawn from the slots during operation of the meter, for obvious reasons.

Thus, the liquid, under pressure causes revolution of the vanes and wings, and such liquid is carried around the inner side of the spherical housing between adjacent pairs of blades and vanes and is discharged through opening 51 into chamber 10 and from thence through the discharge opening 55 to the ultimate dispensing point. At no time are openings 50, 51 opened at the same time, hence all of the liquid passing from the opening 50 to opening 51 must be carried around between the equally spaced vanes and wings, thereby insuring accuracy in the measure indicated by the counters 19 since only a predetermined uniform amount of liquid can pass through the housing upon each revolution of the wings and vanes about the axes of the cones 20, 20'.

By adjusting screw 30, this amount can be readily and accurately varied, as desired.

The purpose of opposing the half round recesses in ring 37 to the elongated recesses in ring 38 and visa versa, is to enable the slight movement of the shafts 43 circumferentially of the rings essential to simultaneous rotation of members about angularly connected axes.

Having described my invention, I claim:

1. In a liquid meter, a hollow, spherical housing, a rotor revoluble therein, said rotor comprising a plurality of pairs of blades extending from slidable engagement at one of their edges with the walls of said housing toward a point centrally therein, the said edges of the blades, respectively, in slidable engagement with said walls, being longitudinally curved to conform to the spherical contour of the inner sides of said walls, each of said blades being formed with substantially straight edges extending convergently toward said central point from its curved edge, pivot means pivotally mounting two of the straight edges of the blades of each pair for rotation thereof about an axis extending through said point, with the blades of each such pair extending oppositely from said axis, means revolvably supported on the walls of said housing mounting said pivot means for revolving about said point while the blades are pivotally supported on said pivot means, means mounting the others of the straight edges of said blades respectively for swinging said blades on said pivot means, relatively, during each revolution of said pivot means, and an inlet and an outlet for liquid at spaced points in said walls respectively positioned to be scanned by the curved edges of said blades in succession during revolution of the blades in said housing, said blades being positioned relative to each other and to said inlet and outlet to be actuated for revolving in said housing upon admission of liquid to said inlet.

2. A liquid meter comprising, a hollow, spherical housing, a plurality of spaced blades within said housing extending substantially radially relative to the center of said housing, means supporting said blades for revolving in an annular path within said housing as a unit about said center with their flat sides disposed transversely of said path, said means comprising a ring revolvable within said housing and secured to the blades at their radially outwardly facing ends, rotary means within said housing in sliding engagement with said blades for edgewise movement of the blades relative thereto during revolution of said blades, said rotary means being cooperative between the housing walls and said blades upon said movement to provide a plurality of separate chambers of progressively increasing and progressively decreasing volumes over separate portions of the distance of travel of said blades during each complete revolution of the blades in said housing when the latter are revolved, a liquid inlet in said housing adjacent the point in said path where said edgewise movement is effective for causing increase in said volume and a liquid outlet in said housing adjacent the point in said path where said edgewise movement is effective for causing decrease in said volume whereby the blades will be caused to revolve upon liquid under pressure entering said inlet.

3. In a construction as defined in claim 2, said inlet and said outlet being at opposite sides of said housing and at opposite sides of said ring, said housing being divided into halves in the plane in which said ring is disposed, an annular groove formed in the inner side of said housing at the juncture of the halves of the latter supporting said ring for revolving therein, and means removably securing said halves together.

4. A liquid meter comprising a hollow, spherical housing, a plurality of spaced blades within said housing extending substantially radially relative to the center of said housing, means supporting said blades for revolving in an annular path as a unit about said center with their flat sides disposed transversely of said path, said means comprising a ring revolvable within said housing and secured to the blades at their radially outwardly facing ends, rotary means within said housing in slidable engagement with said blades for edgewise movement of the blades relative thereto during revolution of said blades, said rotary means being cooperative between the housing walls and said blades upon said movement to provide a plurality of separate chambers of progressively increasing and progressively decreasing volumes over separate portions of the distance of travel of said blades during each complete revolution of the blades in said housing when the latter are revolved, a liquid inlet in said housing adjacent the point in said path where said edgewise movement is effective for causing increase in said volume and a liquid outlet in said housing adjacent the point in said path where said edgewise movement is effective for causing decrease in said volume whereby the blades will be caused to revolve upon liquid under pressure entering said inlet, said ring being divided circumferentially into two parts, said parts being slidable circumferentially relative to each other and means connecting alternate blades to one and to the other of said parts whereby adjacent blades are movable toward and away from each other during revolution in said path, and means limiting said latter movement.

5. A liquid meter comprising, a hollow, spherical housing, a plurality of spaced blades within said housing extending substantially radially relative to the center of said housing, a ring revolvable within said housing supporting said blades for revolving in an annular path within said housing as a unit about said center with their flat sides disposed transversely of said path, means rotatable within said housing in sliding engagement with said blades for edgewise movement of the blades relative thereto during revolution of said blades, said last mentioned means being cooperative between the housing walls and said blades upon said movement to provide a plurality of separate chambers of progressively increasing and progressively decreasing volumes over separate halves of the distance of travel of said blades during each complete revolution of the blades in said housing when the blades are revolved, a liquid inlet in said housing adjacent the point in said path where said movement is effective for causing increase in said volume, and a liquid outlet in said housing disposed substantially diametrically opposite said inlet and at adjacent the point in said path where said edgewise movement is effective for causing decrease in said volume, each of said blades extending outwardly from opposite sides of said ring, each blade being divided in the plane of the ring into halves, and a pivot connecting the halves together for swinging of the halves on the pivot, and each of said pivots being connected with said ring for movement therewith.

6. A liquid meter comprising a hollow, spherical housing, a plurality of spaced blades within said housing extending substantially radially relative to the center of said housing, means supporting said blades for revolving in an annular path within said housing as a unit about said center with their flat sides disposed transversely of said path, rotary means within said housing in slidable engagement with said blades for edgewise movement of the blades relative thereto during revolution of said blades, said rotary means comprising a pair of members respectively rotatably supported on the housing walls at opposite sides of said path about axes extending radially from said center and angularly with respect to each other, supporting means supporting said members for rotation about said axes, said members being formed with slots slidably receiving said blades for said edgewise movement, means for moving one of said members circumferentially of the housing to adjusted positions for changing the angularity of its axis of rotation with respect to the axis of rotation of the other member, means for securing said one of said members in adjusted position, an inlet for liquid at one side of said housing and an outlet for the liquid at the opposite side of said housing, said blades and said members being cooperative with each other and with the walls of the housing to provide chambers of increasing and decreasing volumes over substantially separate halves of the distance of travel of said blades in said housing when the latter are revolved, and said inlet and outlet being positioned respectively to communicate with said chambers adjacent the point of increase and decrease in said volumes.

7. In a liquid meter, a hollow, spherical housing, a rotor revoluble therein, said rotor comprising a plurality of pairs of blades extending from slidable engagement at one of their edges with the walls of said housing toward a point centrally therein, the said edges of the blades, respectively, in slidable engagement with said walls, being longitudinally curved to conform to the spherical contour of the inner sides of said walls, each of said blades being formed with substantially straight edges extending convergently toward said central point from its curved edge, pivot means pivotally mounting two of the straight edges of the blades of each pair of blades for rotation thereof about an axis extending through said point, with the blades of each such pair extending oppositely from said axis, means revolvably supported on the walls of said housing mounting said pivot means for revolving about said point while the blades are pivotally supported on said pivot means, means mounting the others of the straight edges of said blades respectively for swinging said blades on said pivot means, relatively, during each revolution of said pivot means, and an inlet and an outlet for liquid at spaced points in said walls respectively positioned to be scanned by the curved edges of said blades in succession during revolution of the blades in said housing, said blades being positioned relative to each other and to said inlet and outlet to be actuated for revolving in said housing upon admission of liquid to said inlet, the means mounting said pivot means comprising a ring extending circumferentially around the inner sides of said housing, said housing being divided circumferentially in the plane of said ring into halves, complementary recesses formed in the adjacent edges of the halves providing a groove slidably supporting said ring therein when the halves are secured together, said halves being formed with outwardly projecting annular flanges around their adjacent edges, an outer casing enclosing said housing, said outer casing being divided substantially in the plane of said ring into separable portions and means removably securing the separable portions together with the said flanges clamped therebetween whereby said halves are secured together and the ring is secured in said groove by last said mentioned means and whereby said housing provides a partition in said casing, an inlet and an outlet in said casing for liquid positioned for supplying liquid to the sides of said housing respectively, provided with the said inlet and outlet formed in said housing.

THOMAS A. McCOY.